United States Patent [19]

Frey

[11] 4,165,162

[45] Aug. 21, 1979

[54] TRACK-TYPE SLIDE PROJECTOR MAGAZINE

[76] Inventor: Gerald J. Frey, 1486 Cantera Ave., Santa Barbara, Calif. 93110

[21] Appl. No.: 826,551

[22] Filed: Aug. 22, 1977

[51] Int. Cl.$^2$ ............................................. G03B 23/08
[52] U.S. Cl. ...................................... 353/109; 40/512; 198/795
[58] Field of Search .......................... 353/109; 40/512; 198/795; 193/38

[56] References Cited

U.S. PATENT DOCUMENTS

| | | | |
|---|---|---|---|
| 3,170,369 | 2/1965 | Frey et al. | 353/109 |
| 3,632,200 | 1/1972 | Frey | 353/109 |
| 3,729,254 | 4/1973 | Frey et al. | 353/109 |
| 3,799,665 | 3/1974 | Frey | 353/109 |
| 3,820,886 | 6/1974 | Frey et al. | 353/109 |
| 3,848,726 | 11/1974 | Wiemer | 198/795 |
| 3,972,140 | 8/1976 | Caspatto | 40/512 |
| 4,094,599 | 6/1978 | Frey | 353/109 |

Primary Examiner—Steven L. Stephan
Attorney, Agent, or Firm—Fulwider, Patton, Rieber, Lee & Utecht

[57] ABSTRACT

A slide magazine insertable in a side opening in a slide projector and comprising a plastic body with a continuous rail having two elongated sidewalls and two arcuate endwalls, and a cross-plate giving the body an H-shaped transverse cross-section. A grooved drive shaft is rotatably mounted within one arcuate endwall, and a plurality of plastic slide holders are slidably mounted on the rail, each having a dovetail-like notch in its inner side receiving the rail, two detent fingers extending toward each other on the inner side of the rail, and a slotted slide-holding frame on the outer side. The magazine body is divided into relatively movable end sections that are urged together by a spring for pressing the stack of holders toward the shaft, and the track is shaped to tilt the holders toward the shaft for positive pick-up of the detent fingers by the grooves in the shaft, to feed the holders around the rail, the grooves and the fingers having mating V-shaped cross-sections. Slideways span the gaps in the rail between the end sections to support the holders across the gaps, through the fingers, independently of the rail.

37 Claims, 9 Drawing Figures

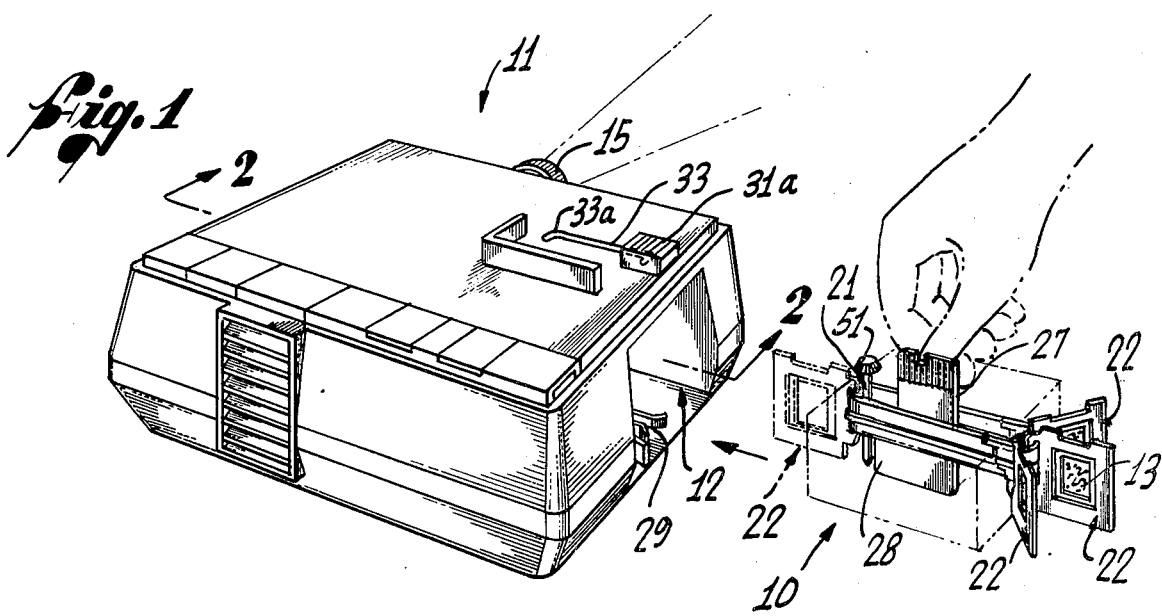
Fig. 1
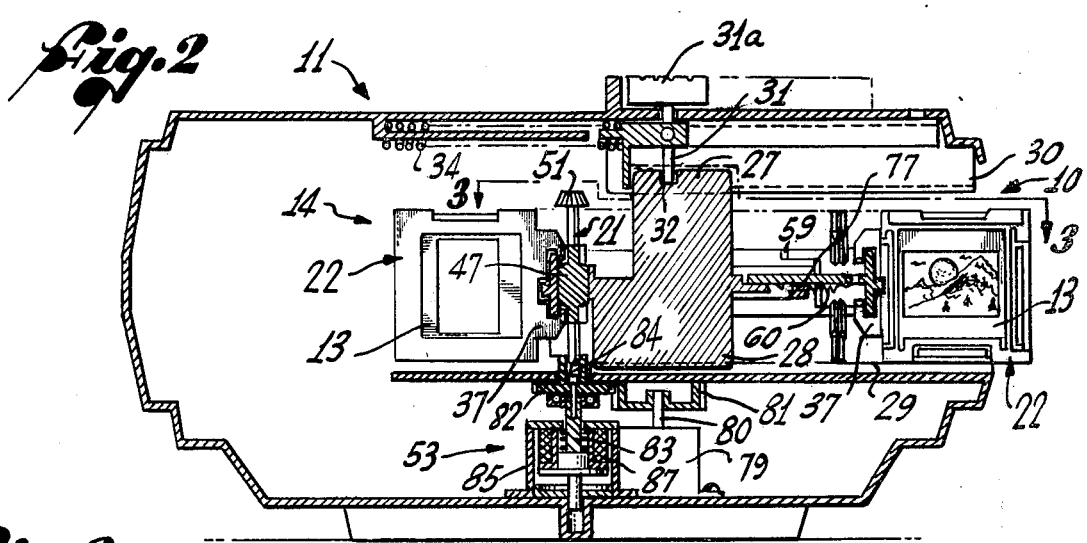
Fig. 2
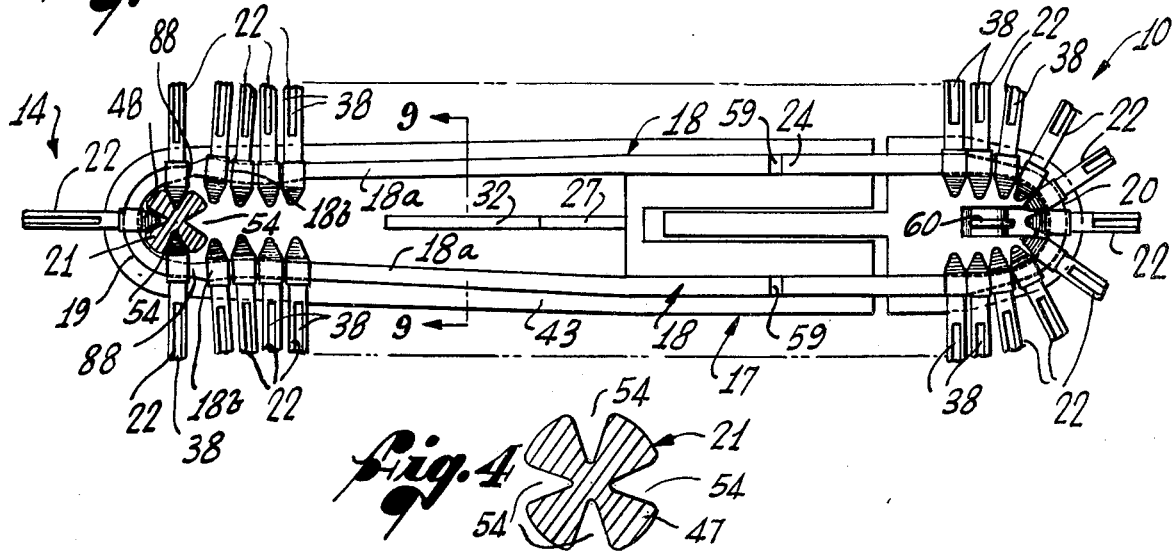
Fig. 3
Fig. 4

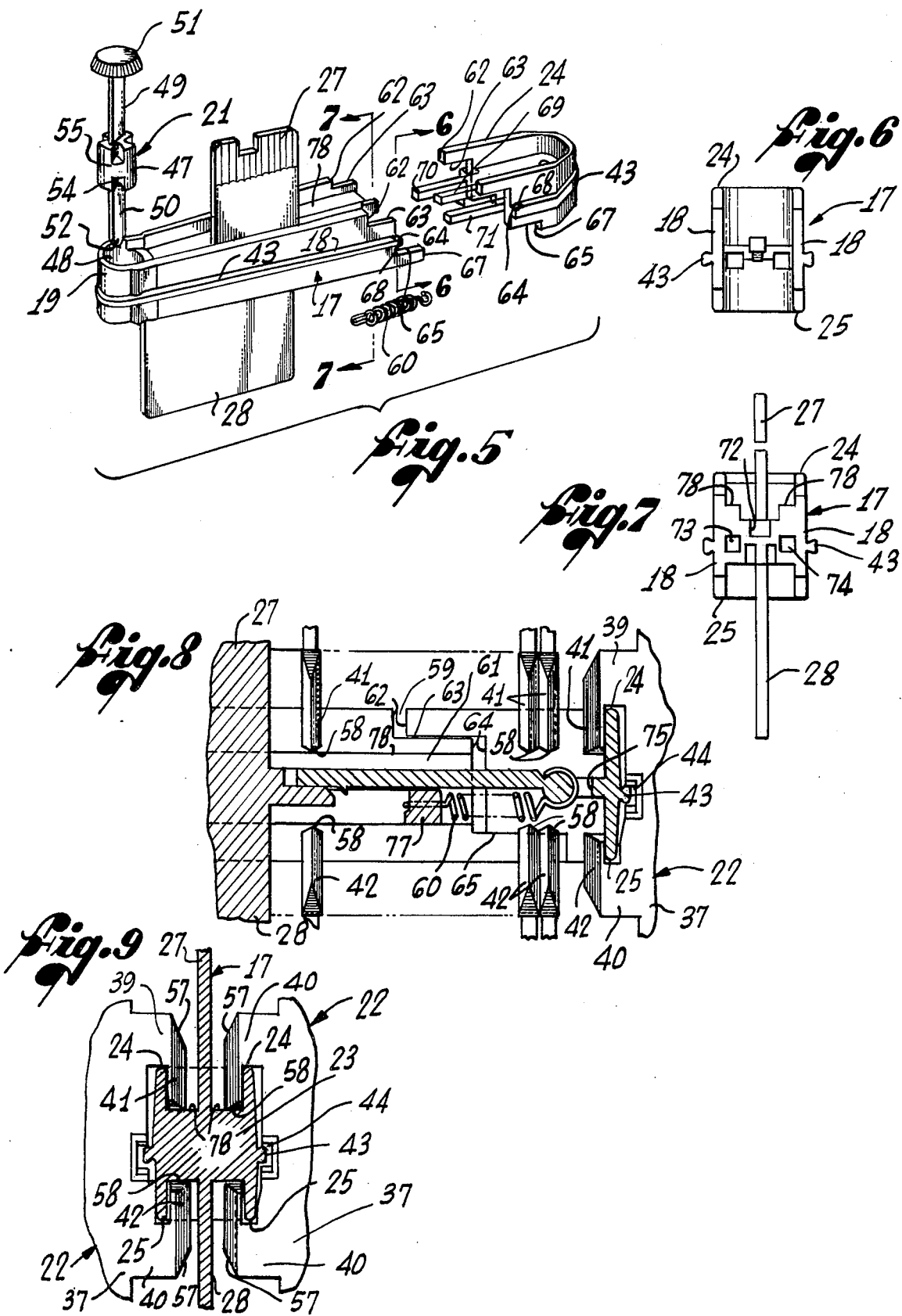

TRACK-TYPE SLIDE PROJECTOR MAGAZINE

BACKGROUND OF THE INVENTION

This invention relates to magazines for slide projectors, and particularly to magazines of the so-called "flexible" type in which a plurality of slides are held in individual clip-type holders for movement along an endless path having two elongated side sections joined by two arcuate end sections.

In such magazines, each slide is held with one edge adjacent the magazine body, which in the past has been a flexible belt, to extend outwardly therefrom, perpendicular to the side sections and radially of the arcuate end sections. One prior projector and magazine of this type are shown in U.S. Pat. No. 3,729,254. In the projector of this patent, the belt is mounted around two parallel shafts to give it the desired shape, one of the shafts being square in cross-section to hold the slides at ninety-degree angles to each other as they pass around this shaft, and being driven in ninety-degree steps to feed the slides through the projector and swing them one by one through a film gate or projection station adjacent the square shaft.

The advantages of flexible-magazine projectors now are well known, and include, among others, smooth and rapid slide changing, as fast as four or more per second, jam-free operation, and compact slide storage. Difficulties have been experienced, however, in the manufacture of the belt-type magazines, which typically utilize metal clips that are adhesively bonded to the outer side of a fabric belt, and in the adaptation of these magazines for slides having frames of different thicknesses. In addition, there is some question as to the long term durability of such magazines, and they generally lack a sophisticated appearance.

Consideration has been given to substitutes for such fabric-and-metal combinations, one alternative approach being shown in U.S. Pat. No. 3,820,886. In this patent, a number of different molded plastic holders are hingedly joined together, either by integral plastic hinges or by special hinged connections, thus eliminating the need for metal parts, and in at least some embodiments, simplifying the assembly operations required. Although the magazines of this patent are believed to be workable alternatives to the original belt-and-clip magazines, they have not found commercial acceptance, perhaps because of tooling costs involved in some embodiments, and perhaps because of assembly costs of others.

A prior flexible-belt projector, shown in U.S. Pat. No. 3,170,369, used a cartridge approach. In this magazine, the belt was mounted in an open-ended magazine box, on shafts that were permanently mounted in the magazine, one shaft being square, as in U.S. Pat. No. 3,729,254, to position the slides for projection. Bulk was an added disadvantage of this magazine, along with the same problems and questions that exist with the present magazines using unsupported belts and metal clips.

The principal objective of the present invention is to avoid the disadvantages of the magazines in the aforesaid patents, while maintaining the advantages of the flexible-type magazine, and specifically to provide a cartridge-type flexible magazine that is compact, both in construction and storage of slides, is capable of being mass-produced of molded plastic parts and economically assembled, and remains smooth, positive and trouble-free in operation, being virtually the same in this respect as the belt-type magazine.

SUMMARY OF THE INVENTION

The present invention resides in a slide magazine of the foregoing general character having an elongated, relatively narrow body on which individual slide-holders are slidably mounted on a track defining an endless path, including two elongated sidewalls and two arcuate endwalls, and are driven by abutments on a drive shaft that is rotatably mounted on the body within one of the arcuate endwalls, the shaft preferably being a part of the magazine, and both the body and the holders being capable of being mass-produced as plastic parts. Thus, the invention provides a compact and relatively simple cartridge-type magazine that virtually duplicates the action of the belt-type projector with mass-produced parts.

More specifically, the magazine shown herein as the preferred embodiment of the invention comprises a plastic body in which the track is a rail which has top and bottom edges disposed in parallel planes (that are horizontal in the normal operating attitude of the magazine), and a central web or cross-plate that gives the body an H-shaped transverse cross-sectional shape. The magazine is filled with a preselected number of slide holders, each having a base disposed along the outer side of the rail, two hook-like detents on the inner side of the base extending respectively over and under the rail and having fingers extending toward each other on the inner side of the rail, and means on the outer side of the base for holding a slide with one edge adjacent the rail to extend outwardly from the rail, radially of the arcuate sections. The detents and the base cooperate to define dovetail-like notches in the holders for sliding freely but securely along the rail, and a rib is formed along the outer side of the rail below the top edge, with a top surface that engages a downwardly facing abutment wall in each notch, to resist tilting and binding of the holders.

The drive shaft is rotatably mounted in a bore in the crossplate, coaxial with one arcuate endwall, and has angularly spaced grooves, preferably of V-shaped cross-section, with walls constituting drive abutments that are engageable with coupling surfaces on the inner sides of the detent fingers. Preferably, these surfaces also are V-shaped, and there are four driving grooves in the shaft, for feeding of holders in ninety-degree increments around the arcuate endwall, as in the belt-type magazine.

To insure positive and smooth engagement of holders with the drive shaft, means are provided to maintain a force urging the holders toward the shaft, and also to yield with increases in the forces within the stack of holders on the rail. For this purpose, the magazine body is made longitudinally expandable and contractable, and spring means continually act to contract it. The preferred contractable body is made in two pieces, divided longitudinally along the sidewalls into two relatively movable end sections that are slidably engaged with each other, and is slightly overfilled with slide holders so that a small gap is maintained between the end sections. A spring is stretched between the end sections, and spanning bars are provided to extend across the gaps in the side sections to engage the upper fingers and maintain the holders in alignment with the rail as they slide from one section to the other.

Engagement of the holders with the drive shaft also is assisted by a special rail configuration adjacent the shaft, for turning the V-shaped coupling surfaces toward the shaft for positive pick-up by the grooves therein, and then camming and guiding the surfaces into firmly seated engagement in the grooves. This driving arrangement operates equally well in each direction, for reversible projector operation.

Preferably, the drive shaft has a central grooved section for engagement with the holders, and opposite end portions, above and below the magazine body, constituting, respectively, a manual operator for the magazine and a drive coupling that is engageable with the drive mechanism of the projector. Other aspects and advantages of the magazine will become apparent from the following detailed description, taken in conjunction with the accompanying drawings.

BRIEF DESCRIPTION OF THE DRAWINGS

FIG. 1 is a perspective view of a slide projector and a magazine embodying the novel features of the present invention, the magazine being shown in position for insertion in the projector, with several representative slide holders in full lines, with one slide holder in broken lines in the eventual position in which it will lie in the filmgate, and with the dotted outline of a load of slides along the side sections of the rail;

FIG. 2 is an enlarged cross-sectional view taken substantially along line 2—2 of FIG. 1 after the magazine has been inserted and one slide has been turned into the filmgate;

FIG. 3 is an enlarged fragmentary cross-sectional view taken substantially along line 3—3 of FIG. 2, showing portions of the slide holders at each end of the magazine and a dotted outline of portions of holders along the side sections;

FIG. 4 is an enlarged cross-sectional view of the drive shaft in FIG. 3;

FIG. 5 is an exploded perspective view of the parts of the magazine other than the slide holders;

FIGS. 6 and 7 are enlarged cross-sections taken along lines 6—6 and 7—7 of FIG. 5;

FIG. 8 is a greatly enlarged fragmentary cross-sectional view of the right-hand end of the magazine, similar to part of FIG. 2; and FIG. 9 is an enlarged fragmentary cross-sectional view taken substantially along line 9—9 of FIG. 3.

DETAILED DESCRIPTION OF THE PREFERRED EMBODIMENT

As shown in the drawings for purposes of illustration, the invention is embodied in a mazine 10 for use in a slide projector 11 having a side opening 12 for receiving the magazine. The magazine is functionally similar to the flexible type shown in the aforesaid U.S. Pat. No. 3,729,254, in which a plurality of slides are held in a series for movement along an endless path having an arcuate section at each end of two substantially straight side sections, each slide being gripped along one edge to project outwardly, perpendicular when on the side sections and generally radially of the arcuate sections.

In the projector 11, slides 13 are fed step-by-step around the magazine 10 along a path of substantially the same shape, and one by one into a filmgate at 14 (FIG. 2), where a beam of light from a lamp (not shown) is directed through the transparent portion of the slide and through a lens system including a focusing lens 15 (FIG. 1). The projector has the usual components and controls, which are not directly relevant to the present invention and thus are not described in detail herein. Reference is made to a co-pending application entitled Flexible Magazine Slide Projector With Movable Lens, being filed herewith, for details of a lens system, usable with this invention.

In accordance with the present invention, the magazine 10 has an elongated body 17 capable of being molded of plastic and comprising a rail defining an endless path for the slides 13, with two elongated sidewalls 18 and two arcuate endwalls 19 and 20, and a drive shaft 21 is rotatably mounted in one of the arcuate endwalls to feed slides around this wall. The slides are held in individual slide holders 22, also capable of being molded of plastic, each having hook-like detents fitted around the rail and slidably mounting the holders thereon. The drive shaft has abutments for engaging projections on the inner sides of the holders and feeding them step-by-step along the rail, and the rail and body are specially designed to insure that the holders are picked up by the shaft as the latter rotates. Thus, the invention provides a cartridge-type magazine that virtually duplicates the action of prior belt-type magazines, with several advantages in massproduction manufacturing economy, durability, and sales appeal, as well as compactness of construction and storage.

More specifically, as shown most clearly in FIGS. 3 and 9, the body 17 of the preferred slide magazine 10 is of H-shaped transverse cross-section formed by the rail and a cross-plate connecting the sidewalls of the rail in an intermediate horizontal plane. The rail is an upright band or wall substantially wider vertically than its transverse thickness and having top and bottom edges 24 and 25 in spaced horizontal planes. Integral with the cross-plate 23, in a central vertical plane, is an upper tab 27 (see FIGS. 1 and 2) that forms a grip above the rail facilitating handling of the magazine, particularly when it is loaded with slides, and a lower base 28 that projects downwardly, below the rail. These upper and lower members are co-planar, and fit into grooves 29 and 30 in the projector forming slideways for positioning the magazine as shown in FIG. 2.

A slidable detent plunger 31 carrying a knob 31a preferably latches the magazine in the projector. In this instance, the plunger is movable into and out of a notch 32 in the upper edge of the upper tab 27, to latch and unlatch the magazine. The plunger is guided in a slot 33 in the upper wall of the projector case for movement into a latched condition in a lateral leg 33a (FIG. 1) of the slot and is urged toward an unlatched position, to the left in FIGS. 1 and 2, by a spring 34 (FIG. 2) acting against a bracket 35 carried by the plunger inside the case. The tab 27 abuts against this bracket as the magazine is inserted in the projector, and shifts the plunger to the left to the position shown in FIG. 2, the lower end of the plunger entering the notch 32 as it moves along the slot leg 33a. Movement of the plunger out of the slot leg 33a releases the magazine, and further movement, to the left along the slot, ejects the magazine from the projector.

The slide holders 22 mounted on the magazine body 17 have inner side portions 37 (See FIG. 9) constituting the bases of the holders and disposed alongside the outer side of the rail, means on the inner sides of these bases mounting the holders slidably on the rail, and means on the outer sides of the bases for holding slides 13 with one edge of each slide movable along the rail, and the body of the slide projecting outwardly from the rail. Accordingly, the slides are moved "broadwise" along the rail, substantially perpendicular to the sidewalls and in radially projecting positions around the arcuate endwalls.

It is to be noted that the slide-holding means of the holders may take various forms, some examples being illustrated in U.S. Pat. No. 3,820,886. The holding means shown herein are merely illustrative of one such form, and are not intended to be limiting in any way. The illustrative holding means, shown in FIGS. 1, 2 and 3, comprise a molded plastic frame that is integral with, and projects outwardly from, the base 37 of the holder, having a slot 38 opening through its upper edge (see FIG. 3) to receive the slide, and having two aligned rectangular openings in its opposite broad sides, through which the transparent portion of the slide 13 is seen. Thus, the frame of each slide is securely held, while the transparent portion is uncovered for projection through the holder.

As shown most clearly in FIG. 9, the preferred mounting means for the holders 22 comprise two hook-like detents 39 and 40 extending from the bases 37 inwardly across the top and bottom edges 24 and 25 of the rail, with retaining fingers 41 and 42, forming the free end portions of the detents and extending toward each other along the inner side of the rail. These fingers have free ends that are more closely spaced than the width of the rail, and thus retain the holders slidably on the rail. In effect, the fingers and the inner sides of the bases 37 define dovetail-like notches in which the rail is disposed, each notch having upper and lower edges riding, respectively, along the top and bottom edges 24 and 25 of the rail, while the outer sides of the fingers 41 and 42 slide along the inner side of the rail, and the inner wall of the base 37 slides along the outer side of the rail.

Because the weight of the slide 13 is carried on the outer side of the holder 22, a leverage factor exists that tends to tilt the holder downwardly and cause binding of the holder on the rail. To minimize such binding, a rib 43 is formed on the outer side of the rail, with an upper side for bearing against a downwardly facing surface of the holder, herein the top wall 44 of a notch formed in the inner wall of the base. These bearing surfaces reduce the tilting of the holder, and eliminate binding and drag between the lower finger 42 and the rail. As can be seen in FIG. 9, this maintains the lower fingers 42 in spaced relation with the inner side of the rail, so that they serve only as retainers, and not as bearings.

Preferably, the upper surface of the rib 43 is inclined upwardly, as shown in FIG. 9, to reduce the bearing area between the rib and the notch wall, thereby reducing drag. The same principle preferably is applied in designing the top and bottom edges 24 and 25 of the rail, which herein are rounded to reduce bearing area to nearly "line" contact.

The drive shaft 21 is rotatably mounted in the cross-plate 23 within the arcuate endwall 19 of the rail. As shown in FIGS. 3 and 5, the illustrative shaft has a central cylindrical section 47 in the form of a drum that is rotatably mounted in a cylindrical bore 48 in the cross-plate, and has opposite end portions 49 and 50 projecting upwardly and downwardly, respectively, from the drum, the upper portion carrying a hand knob 51 for rotating the shaft manually, and the lower portion having a lower end 52 that is engageable with an automatic drive mechanism 53 of the projector 11, as shown generally in FIG. 2.

Formed in the periphery of the central section 47 are four drive grooves 54 that are equally spaced around the periphery, at angular increments of ninety degrees. Each groove is V-shaped in cross-section, with a slightly rounded inner end and outer corners, as shown in FIG. 4. In the illustrative shaft, each groove is interrupted by a central dividing wall 55, as shown in FIG. 5, leaving upper and lower groove sections for driving engagement with the slide holders 22.

This driving engagement takes place with the inner edge portions of the two detent fingers 41 and 42 of each holder 22, these edge portions being beveled as shown in FIGS. 3, 8 and 9 to a mating V-shaped cross-section for fitting snugly in the grooves, in surface-to-surface contact with the groove walls. Thus, the groove walls constitute the driving abutments of the shaft, and the fingers constitute the driven projections on the holders. As can be seen in the drawings, the grooves 54 are formed in the drum at the levels of the inner sides of the fingers 41 and 42. The inner corners of the hook-like detents 39 and 40 preferably are beveled as shown at 57, and the adjacent, free ends of the fingers 41 and 42 are given a flat "V" shape, shown at 58 in FIG. 8.

These ends of the fingers ride along the opposite sides of the dividing walls 55 in the grooves 54 of the shaft 21, preferably with close fits. With such an arrangement, the fingers 41 and 42 of the holders may be used to retain the shaft in place, since there usually are at least two, and generally three, holders in engagement with the shaft, as shown in FIG. 3. It will be evident, however, that this is a matter of choice, and that the shaft may be of constant diameter, with uninterrupted grooves, and held in place in a conventional manner.

Positive pick-up of the inner sides of the detent fingers 41 and 42 by the grooves 54 in the shaft 21 is important to reliable operation of the magazine 10 of the present invention, and is one of the key aspects of the invention. For this purpose, the holders 22 are tilted slightly to improve the pick-up angle of the fingers relative to the shaft, as the holders approach the shaft, and are urged yieldably toward the shaft with a light spring force that holds each set of fingers firmly against the shaft, ready for positive pick-up.

The tilting of the holders 22 is accomplished by modifying the generally straight path defined by the sidewalls 18 of the rail, first inclining the rail inwardly at a slight angle, as shown at 18a in FIG. 3, and then, at 18b close to the shaft 21, inclining the rail outwardly so that each pair of fingers is tilted toward the shaft at the pick-up point. These modifications can be seen in FIG. 3 as gradual convergence of the sidewalls of the rail toward the left at 18a, and divergence of the sidewalls toward the left at 18b, as the sidewalls reach the shaft.

To press the fingers 41 and 42 against the shaft 21, the body 17 of the magazine 10 is made longitudinally expandable and contractable, is slightly over-filled with slide holders 22, and is yieldably urged toward the contracted condition, thus applying pressure through the stack of slide holders to those holders that are next to the shaft. To these ends, the body herein is divided transversely along the sidewalls 18, preferably near the right-hand end, into two relatively movable end sections that are best seen in FIG. 5, and these end sections are fitted together for longitudinal sliding, to open and close a variable gap 59 between the end sections and in the rail, as can be seen in FIGS. 3 and 8. A spring 60 is stretched between the two end sections to urge them together, actually to pull the otherwise unsupported right end section toward the left, and means are provided along both sides of the rail at the gaps in the sidewalls to maintain the holders in alignment with the rail as they pass across the gaps.

The division of the body 17 is made along stepped lines to provide longitudinal sliding surfaces on the two end sections, the parting line herein including a short vertical shoulder 62 from the top edge of the rail on each side, a horizontal step 63, a longer vertical shoulder 64, a second horizontal step 65, and finally a short vertical shoulder 67 to the bottom edge 25. These surfaces are designed as if formed by cutting through a full body, but actually are mating surfaces on two separately formed parts. Each vertical shoulder and horizontal step on one end section fits against a similar, but opposed, shoulder or step on the other end section, so that the two sections slide smoothly relative to each other toward and away from a maximum contracted position in which the opposed vertical shoulders would abut. The ends of the rib 43 at the dividing line preferably have opposed, interfitting bevels 68.

The cross-plate 23 is divided to provide an interfitting sliding connection which locks the end sections against transverse displacement. This connection may take various forms, and herein comprises three bars 69, 70 and 71, each secured at its right end to the right end section of the body 17 and projecting longitudinally to the left into three longitudinally extending guideways 72, 73 and 74 (FIG. 7) opening to the right through the adjacent end of the left end section. The bars are rectangular in transverse cross-sectional shape, and join the sections securely, but slidably, together.

A recess is formed in the underside of the cross-plate 23, across the division, to house the spring 60. As shown in FIG. 8, one end of the spring is anchored in a hole 75 in the cross-plate in the right end section, and the other end is hooked around a lug 77 depending from the cross-plate in the left end section. The spring preferably is slightly stretched when the end sections are in abutting engagement.

When the end sections are moved apart to open the gap 59, as shown in FIG. 8, to accommodate a full load of slide holders 22, the spring continuously pulls the end sections together to maintain the holders tightly together and press the stack on each side section of the rail toward the shaft 21. The spanning means for maintaining the holders at the proper level to cross the gap, independently of the rail, preferably are slideways 78 formed on the left end section, as shown in FIGS. 5, 7, 8 and 9, to extend from well to the right (FIGS. 5 and 8) of the shoulders 62 to well to the left of these shoulders, and are positioned to engage the free ends 58 of the upper fingers 41 and thereby slidably support the holders at the same level. Herein, the ways 78 extend all the way to the shaft, so that the lower ends of the upper fingers 41 ride on the ways all the way to the shaft. It should be noted, however, that all that is necessary is the spanning of the gaps in their widest possible condition.

The drive mechanism 53 (FIG. 2) is shown only generally herein, because the present invention is not concerned with a particular type of drive mechanism. As shown for purposes of illustration, the drive mechanism comprises a rotary electric motor 79 having an output shaft 80 carrying a drive gear 81, and this gear meshes with a gear 82 that is mounted on a coupling shaft 83 beneath the operating position of the drive shaft 21 of the magazine 10. On the upper end of the coupling shaft 83 is a socket member 84 shaped to receive the lower end 52 of the drive shaft 21, thereby coupling this shaft to the motor 79.

For selective coupling and uncoupling of a magazine 10, the coupling shaft 83 is axially movable by a solenoid actuator 85 having a coil 87 which, when energized, raises the coupling shaft until the socket member 84 receives the lower end 52 of the magazine shaft 21. When the coil is deenergized, the solenoid actuator lowers the coupling shaft to disengage the socket member and the magazine shaft.

For storage purposes, all of the slides 13 in a loaded magazine 10 can be disposed within a stack as shown in dot-dash lines in FIG. 1, by simply sliding the flaring slides (and their holders 22) at the right end around the right arcuate endwall 20 onto the sidewalls and by clearing one drive groove 54 of the drive shaft 21 at the left end. This is done by pressing the slides on one sidewall away from the shaft 21, as permitted by longitudinal expansion of the magazine body 17, and then turning the shaft away from this sidewall, in effect preventing the shaft from picking up a holder and its slide.

This makes it possible to store a loaded magazine 10 in a container (not shown) only slightly larger than the dot-dash block outlined in FIG. 1. When the magazine is removed from the container, the slides at the right end spring out to the flared positions, generally as shown in FIG. 1, but the slides at the left end remain in the stack, being held by the drive shaft 21. When the drive shaft 21 is turned ninety degrees in either direction, either manually or by the drive mechanism 53, a slide is turned into the position shown in broken lines on the left in FIG. 1, thus being positioned in the filmgate 14 ready for projection.

To change a slide, either in forward or reverse, the drive mechanism 53 is activated to turn the coupling shaft 83 and the magazine shaft 21 ninety degrees in a selected direction, thus shifting a slide holder that is engaged in one of the laterally facing grooves 54 into the filmgate position. As the magazine shaft turns from the position shown in FIG. 3, the vacant groove 54 is turned toward a pair of waiting fingers 41, 42 which are tilted toward the shaft and pressed against its side by the action of the spring 60 tending to contract the magazine body 17 and shift the slide holders on the left end section toward the shaft 21.

Thus, the vacant groove 54 picks up a pair of fingers 41, 42 and the trailing wall of the groove pushes the fingers along the rail 18, off the inclined section 18b and onto the arcuate endwall 19. During this movement, the holder passes over a short section 88 of the rail that is of reduced thickness, allowing freedom of movement of the holder as it is shifted from the inclined section 18b into a laterally projecting radial position on the arcuate endwall 19 of the rail. As the holder reaches this position, however, the rail increases to its normal thickness, to seat the fingers 41 and 42 securely in the groove 54.

The rail thickness then remains substantially constant around the arcuate endwall 19, and holds the fingers 41 and 42 firmly in the grooves. It has been found that this arrangement provides accurate positioning of the slide in the filmgate 14, and makes it possible to eliminate the rather complex positioning forks (not shown) that have been provided for flexible-belt projectors. Very little, if any, additional locating support need be provided for a magazine made in accordance with the present invention, one suitable support being a simple bow-shaped spring wire (not shown) forming a notch for the underside of a slide holder in the filmagte.

Slide changing with the magazine of the invention may be a very rapid operation, consuming as little as one-quarter of a second, or less, and this operation may be repeated rapidly to run through the slides to a desired holder. In this respect, the magazine functions very much like a flexible-belt magazine.

Mass production of these magazines should be relatively inexpensive and rapid. Since the holders 22 are identical, they can be produced with conventional molding techniques using a suitable relatively stiff plastic. The end sections of the body 17 also are moldable of plastic, each in a single piece. Of course, one end section, preferably the longer left one, can be made in different lengths to provide magazines of different preselected capacities.

With the parts ready for assembly, the selected number of slide holders can be slit onto the two separated end sections, which are then fitted together and joined by the spring 60. The only remaining part, the shaft 21, can be inserted in its bore 48 prior to loading with slide holders, and will be retained in place by the fingers 41 and 42 of two holders engaged with two of the grooves 54. If a conventional shaft fastener is used, the shaft can be installed as a separate operation prior to installation of the slide holders. In either event, the magazine uses relatively few parts that are relatively inexpensive when mass-produced.

From the foregoing, it will be evident that the present invention provides a substantially different magazine of the flexible type, and makes it possible to eliminate the earlier fabric belt and metal clips while maintaining virtually the same action and gaining numerous significant advantages. It also will be evident that, while a particular embodiment has been illustrated and described in detail, numerous modifications and changes may be made without departing from the spirit and scope of the invention.

I claim:

1. A magazine for use in a slide projector, comprising:
   an elongated plastic body having two elongated sidewalls disposed in substantially parallel first and second planes, and two arcuate endwalls connecting said sidewalls at the ends of said body and cooperating therewith to form a continuous rail having oppositely facing top and bottom edges disposed in parallel third and fourth planes;
   a rib extending around the outer side of said body and having a top side in an intermediate fifth plane parallel to said third and fourth planes;
   said body being divided along said sidewalls into first and second relatively movable end sections for longitudinal expansion and contraction, said second end section being movably mounted on said first end section;
   spring means yieldably urging said second end section toward said first end section;
   a drive shaft rotatably mounted on said body inside the arcuate endwall of said first end section, said drive shaft having an outer surface coaxial with said arcuate surface of said first end section, and formed with four equally spaced longitudinal driving grooves of V-shaped cross-section therein;
   a series of plastic slide holders mounted and stored on said rail in closely stacked, side-by-side relation to be advanced step by step thereon by said drive shaft, each of said holders having a base positioned along the outer side of said rail and slidably mounted thereon, and slide-holding means carried by said base to hold a slide in an outwardly projecting position for movement around said rail;
   said bases having inner side portions formed with inwardly opening, dove-tail-like notches fitted over said rail, and the open inner sides of said notches being defined between upper and lower fingers projecting toward each other along the inner side of said rail and having outwardly facing edges sliding along the inner side of the rail;
   said notches having top edge walls slidably engaging the top edge of the rail to ride thereon as the holders slide around the rail, and each notch having an abutment edge along its closed outer side slidable along the top side of said rib to resist tilting of the slide holder on the rail;
   drive couplings of V-shaped cross-section on the inner sides of said fingers facing inwardly for engagement with said driving grooves in said drive shaft;
   said slide holders filling said sidewalls and said second end section when said end sections are separated by a small gap, whereby said spring means urge the holders toward said drive shaft;
   the sidewalls of said rail having diverging sections adjacent said shaft for tilting said holders to position said fingers for positive engagement in said grooves;
   and spanning means on said body extending across said gap to maintain said slide holders in alignment with said rail during movement of the slide holders across said gap.

2. A slide magazine as defined in claim 1 in which said end sections have interfitting slide surfaces extending longitudinally of said body and preventing lateral displacement of said end sections while permitting relative longitudinal movement thereof.

3. A slide magazine as defined in claim 1 in which said spanning means comprise bars extending along the inner side of said rail below the top edges of said sidewalls and positioned for engagement with the lower ends of the upper fingers of said slide holders, said bars being secured to one of said end sections and extending across the gap beneath the top edges of the sidewalls of the other end section.

4. A slide magazine as defined in claim 1 in which said body is of H-shaped transverse cross-section, having a web joining said sidewalls together in an intermediate plane between said third and fourth planes, said web also being interrupted to permit relative movement of said end sections.

5. A slide magazine as defined in claim 4 wherein said spring means is a coiled extension spring connected and stretched between separated sections of said web.

6. A slide magazine as defined in claim 4 in which said drive shaft is rotatably mounted in a cylindrical bore in said web in said first end section.

7. A slide magazine as defined in claim 6 in which said drive shaft has a first end portion projecting in one direction beyond said rail and carrying a drive fitting thereon for connection to a drive mechanism.

8. A slide magazine as defined in claim 7 in which said shaft has a second end portion which projects in the opposite direction beyond said rail and carrying a hand knob thereon for manual turning of the shaft.

9. A slide magazine as defined in claim 4 in which each of said dovetail-like notches has the same basic shape as the cross-sectional shape of said sidewalls, including a narrow, vertically elongated slot portion with upper and lower edges for riding along the top and bottom edges of the rail and an outer wall for riding along the outer side of the rail, said outer wall having an internal notch therein fitting over said rib and having an upper wall constituting said abutment edge for sliding on the top side of the rib.

10. A slide magazine as defined in claim 4 further including a lower support for said body connected to the underside of said web between said sidewalls and projecting downwardly beyond said bottom edge, said support having a bottom surface engageable with a slide projector to hold the magazine therein.

11. A slide magazine as defined in claim 10 further including an upper support for said body connected to the upper side of said web in the central portion thereof, between said sidewalls, and projecting upwardly beyond said top edge to provide a grip for holding said magazine.

12. A slide magazine as defined in claim 1 in which said sidewalls have sections converging toward said shaft to a closer spacing than the spacing along the sides of said shaft, and leading to said diverging sections for tilting the holders for engagement with said shaft.

13. A slide magazine as defined in claim 1 in which said rail has sections of reduced thickness positioned to be within the holders as they are engaged by said shaft, providing freedom of movement of the holders during engagement.

14. A slide magazine as defined in claim 13 in which the thickness of said rail increases around said arcuate endwalls to hold said fingers firmly in said grooves.

15. A magazine for use in a slide projector, comprising:
an elongated body of generally H-shaped transverse cross-sectional shape formed by a central cross-plate and a rail extending around said cross-plate, said rail having two elongated sidewalls, two arcuate endwalls, and a top edge defining a substantially continuous slide path;
said body being longitudinally extendable and contractable, and having means thereon yieldably urging its opposite end portions toward each other to contract the body;
a series of slide holders mounted and stored on said rail in closely stacked, side-by-side relation, each of said holders having a base positioned along the outer side of said rail, hook-like detents extending inwardly from the base above and below the rail and including fingers that extend toward each other inside the rail to slide along the inner side of the rail, and means on the outer side of said base for holding a slide with one edge adjacent the rail and projecting outwardly, generally perpendicular to said side-walls and radially of said arcuate endwalls;
and a drive shaft rotatably mounted on said body within one of said arcuate endwalls, said drive shaft having a plurality of outwardly opening, longitudinal drive grooves angularly spaced around its surface, said grooves being engageable with said detent fingers to feed said slide holders around said one arcuate endwall and along said path.

16. A magazine as defined in claim 15 wherein said rail has a rib extending around its outer side, said rib having a top side parallel to said top edge of said rail, and said holders having notches in their inner sides overlying said rib and having top walls riding on said rib.

17. A magazine as defined in claim 15 wherein said body is divided into first and second relatively movable end sections that are slidably joined together and yieldably urged toward each other by a spring stretched between the two end sections.

18. A magazine as defined in claim 17 wherein the portions of said top edge formed by the respective end sections are separable to leave gaps along said sidewalls of said rail, and further including spanning means engageable with the lower ends of the upper fingers to maintain said slide holders in alignment with the rail while passing over said gaps.

19. A magazine as defined in claim 18 in which said spanning means comprise slideways along the inner side of said sidewalls and spaced below said top edge, said slideways being formed on one of said end sections and extending across the gaps between said end sections.

20. A magazine as defined in claim 15 in which said drive shaft has four drive grooves of V-shaped cross-section equally spaced around its periphery, the inner sides of said fingers also being V-shaped in cross-section to fit snugly in said drive grooves.

21. A magazine as defined in claim 15 in which said fingers and the inner sides of said bases cooperate to define dovetail-like notches in said holders, including a relatively narrow gap between said fingers for said cross-plate, and an elongated, relatively narrow slot portion for fitting closely over said rail and having an upper end wall for riding along said top edge, and an outer wall for riding along the outer side of said rail.

22. A magazine as defined in claim 21 further including a rib on said rail along the outer side thereof having a top side parallel to said top edge, said holders having abutment walls for sliding on said top sides.

23. A magazine as defined in claim 15 in which said rail has diverging sections adjacent said shaft, for tilting said holders to engage said fingers in said grooves.

24. A magazine as defined in claim 23 in which said rail has sections of reduced thickness at the ends of said diverging sections, providing freedom of movement of the holders during engagement.

25. A magazine for use in a slide projector, comprising:
an elongated body defining a track having two elongated sides and two arcuate ends connecting said sides;
said body being divided along said sides into first and second relatively movable end sections so as to be longitudinally extendable and contractable;
spring means yieldably urging said end sections toward each other;
a series of slide holders mounted and stored on said track in closely stacked, side-by-side relation, each of said holders having means on its inner side slidably engaging said track, and means on its outer side for holding a slide with one edge along said track and extending outwardly, generally radially of said arcuate ends and perpendicular to said sides;
a drive shaft rotatably mounted within one of said arcuate ends and having a plurality of longitudinal drive grooves in its periphery;
coupling means on each of said slide holders movable along said track and engageable in one of said drive grooves adjacent said one arcuate end;
said slide holders being sized to over-fill said track thereby to maintain said body slightly extended with a gap between said end sections, to maintain spring pressure on the holders adjacent said one arcuate end;

and spanning means extending across said gap to maintain said holders on said track in passing over said gap.

26. A magazine as defined in claim 25 in which said spanning means are slideways formed on one end section and extending across the gap along each of said sides, said slideways being positioned to engage said coupling means and slidably supporting said holders independently of said track.

27. A magazine as defined in claim 25 in which said drive shaft has four equally spaced grooves in its periphery, and said coupling means include inwardly extending projections on said holders for engagement in said grooves.

28. A magazine as defined in claim 27 in which said track is shaped to tilt said holders adjacent said shaft to incline said projections to be picked up by said grooves upon rotation of said shaft.

29. A magazine for use in a slide projector, comprising:

an elongated body of generally H-shaped transverse cross-section having a central cross-plate and a rail extending around said cross-plate, said rail having two elongated sides, two arcuate ends connecting said sides, and top and bottom edges in generally parallel planes;

a series of slide holders mounted and stored on said rail in closely stacked, side-by-side relation, each of said holders having a base positioned along the outer side of said rail, two hook-like detents extending inwardly from the base above and below the rail and including fingers that extend toward each other inside the rail to slide along the inner side of the rail, and means on the outer side of said base for holding a slide with one edge adjacent said rail and extending outwardly, generally perpendicular to said elongated sides and radially of said arcuate ends;

and drive means mounted on said body and engageable with said holders to feed said holders around said rail.

30. A magazine as defined in claim 29 in which said drive means comprise a drive shaft rotatably mounted on said body within one of said arcuate ends, and having a plurality of driving abutments positioned around its periphery for engagement with said holders adjacent said one arcuate end.

31. A magazine as defined in claim 29 in which said driving abutments are the walls of four longitudinal grooves in said drive shaft, said fingers having inner sides shaped and positioned for engagement in said grooves.

32. A magazine as defined in claim 29 further including means for urging the said slide holders adjacent said one arcuate section toward the drive shaft, to engage said inner sides of said fingers in said grooves.

33. A magazine as defined in claim 29 in which said holder bodies and said detents define dovetail-like notches comprising relatively narrow gaps between the ends of said fingers, and elongated, relatively narrow slot portions receiving said rail, said slot portion having end walls riding along said top and bottom edges and an outer wall riding along the outer side of said rail.

34. A magazine as defined in claim 33 in which said outer wall has an internal notch therein, and said rail has a rib extending around its outer side, said internal notch having a top wall riding on said rib.

35. A magazine as defined in claim 31 in which said rail is shaped to tilt said holders adjacent said shaft for engagement of said fingers with said grooves.

36. A magazine as defined in claim 35 in which said rail has diverging sections adjacent said shaft accomplishing said tilting.

37. A magazine as defined in claim 36 in which said rail has sections of reduced thickness at the ends of said diverging sections providing freedom of movement as the fingers are seated in said grooves.

* * * * *